United States Patent [19]

Burkholder

[11] 4,057,277

[45] Nov. 8, 1977

[54] YARD AND GARDEN TOOL

[76] Inventor: Marie L. Burkholder, 806 Devonshire Terrace, Hampton, Va. 23666

[21] Appl. No.: 744,791

[22] Filed: Nov. 24, 1976

[51] Int. Cl.[2] ............................................. A01B 1/18
[52] U.S. Cl. .................................. 294/50.8; 56/400.12
[58] Field of Search ..................... 294/50.8, 50.6, 50.9, 294/51, 106, 118, 119; 56/400.12, 400.17, 400.19, 400.04, 400.01

[56] References Cited

U.S. PATENT DOCUMENTS

| 700,192 | 5/1902 | Grummt | 294/50.8 |
|---|---|---|---|
| 1,588,927 | 6/1926 | Willis | 56/400.12 |

*Primary Examiner*—James B. Marbert
*Attorney, Agent, or Firm*—Clarence A. O'Brien; Harvey B. Jacobson

[57] ABSTRACT

A weed puller and garden tool having two pivotally and detachably connected arms or handles with each arm including a handgrip at one end and detachable connecting means at the other end for connecting a gripping member thereto for use of the device as a weed puller. The arms may be disconnected from each other and various individual tools attached to the connecting means for enabling the arms to be used with various garden tools, and the like, in an interchangeable manner. Also, the connecting means at the ends of the arms enables the two arms to be separated and attached to opposite sides of a garden cart to enable the cart to be easily moved to a desired location for use of various tools supported on the cart by releasing the arms or handles from the cart and attaching selective tools to the arms for use of the arms and tools independently or by pivotally interconnecting the arms in crossed relation and attaching cooperating gripping devices or other tools on the connecting means at the ends of the arms opposite from the handgrips.

9 Claims, 10 Drawing Figures

U.S. Patent  Nov. 8, 1977  Sheet 1 of 2  4,057,277
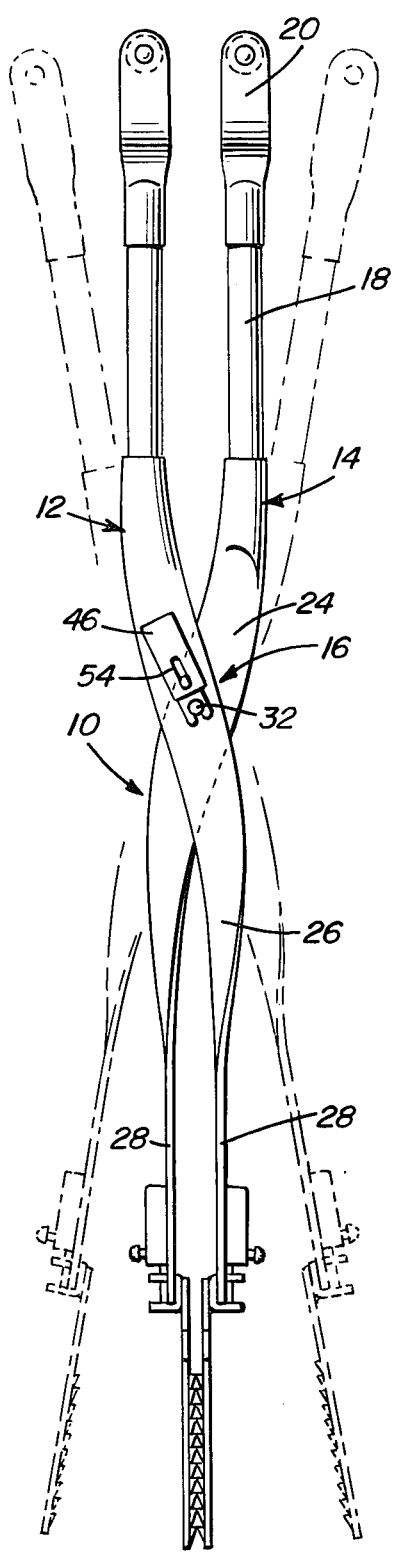
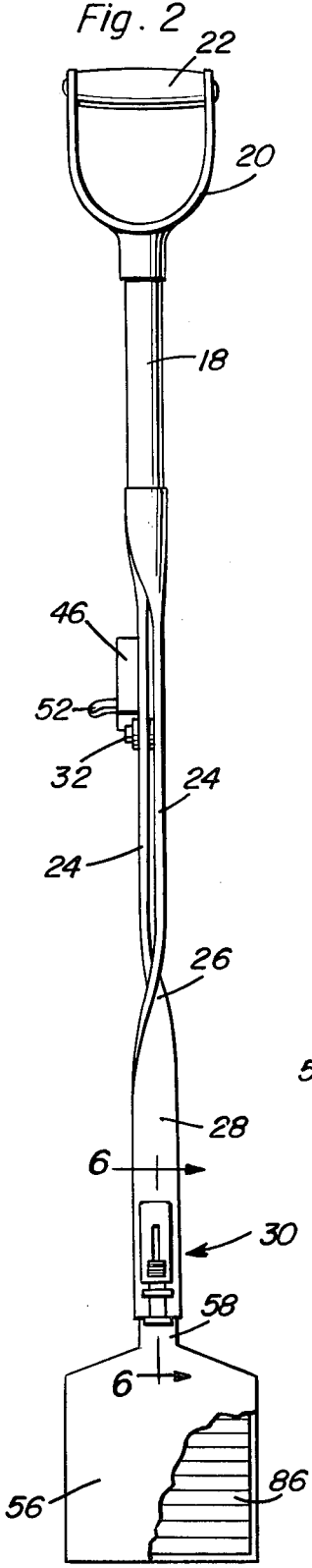
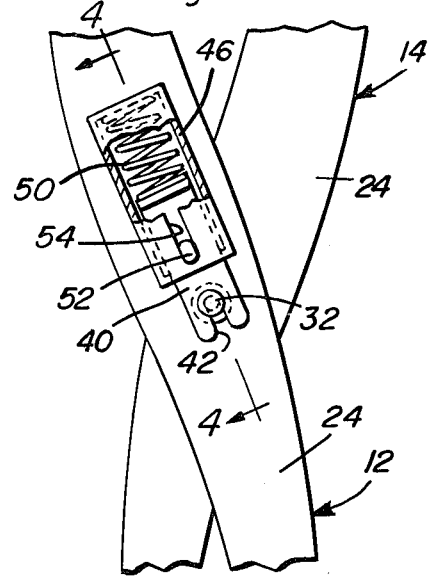
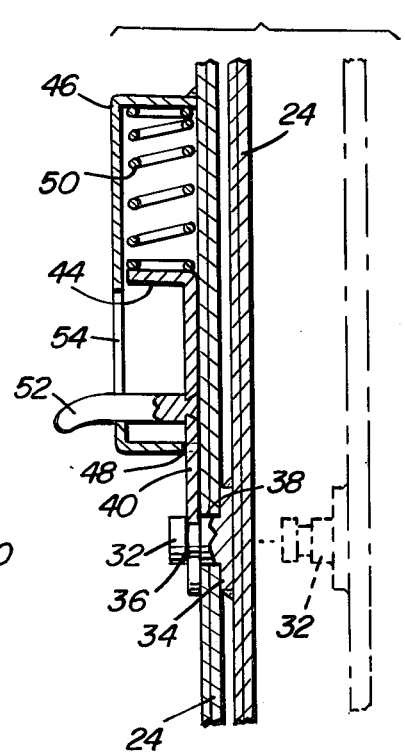
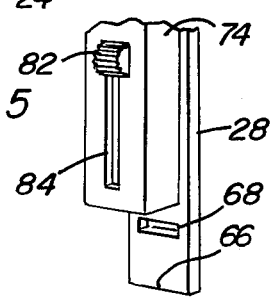

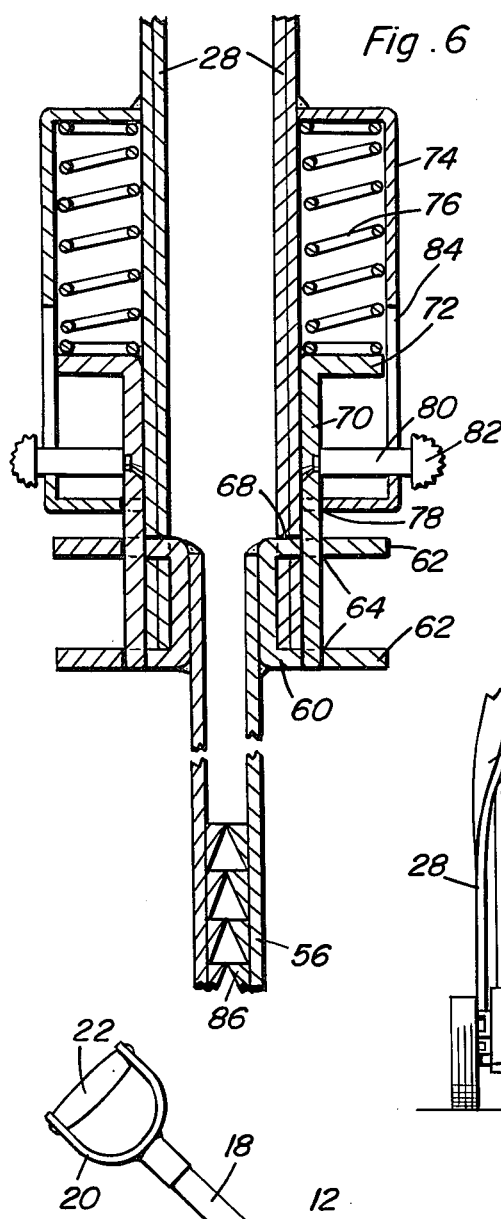
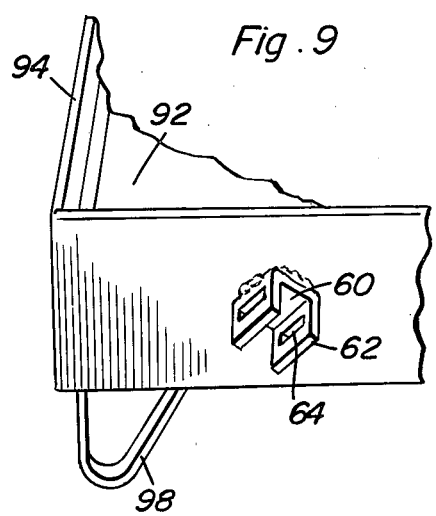
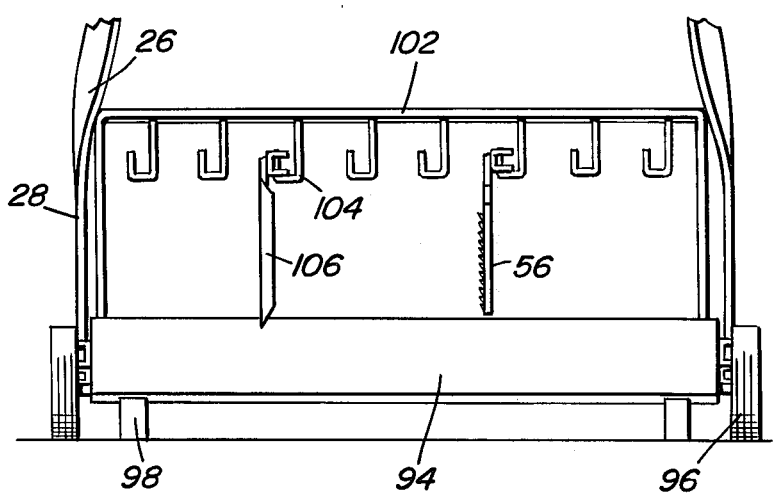
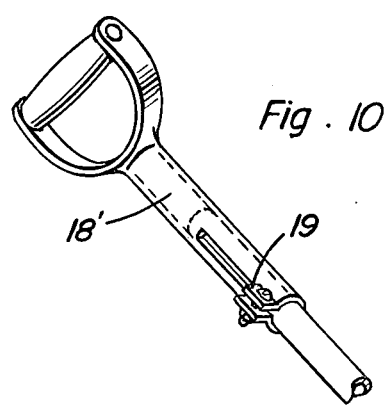
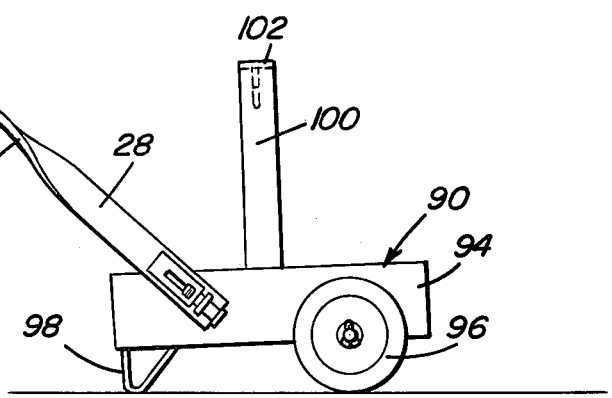

YARD AND GARDEN TOOL

BACKGROUND OF THE INVENTION

1. Field of the Invention

The present invention generally relates to a weed puller and garden tool and more specifically to a pair of elongated arms or handles having handgrips at one end and interchangeable tools selectively connected at opposite ends for use independently or orientation of the arms in crossed pivotal relationship, combined with a garden cart having coacting means thereon to enable the arms to be selectively connected thereto for enabling the arms to be used in moving the cart to a desired site, thereby reducing the number of independent tools necessary for proper lawn or garden care.

2. Description of the Prior Art

Soil digging or working implements incorporating pivotally connected arms or handles are well known with various structures being provided for pivotally interconnecting the components. The following U.S. patents disclose exemplary structures of this type: U.S. Pat. No: 267,766 — Nov. 21, 1882 — Armstrong U.S. Pat. No: 281,194 — July 10, 1883 — Kohler U.S. Pat. No. 325,212 — Aug. 25, 1885 — Kohler U.S. Pat. No: 659,518 — Oct. 9, 1900 — Estlack U.S. Pat. No: 752,115 — Feb. 16, 1904 — Smith U.S. Pat. No: 1,588,927 — June 15, 1926 — Willis.

SUMMARY OF THE INVENTION

An object of the present invention is to provide a weed puller and garden tool which includes a pair of arms or handles which are elongated and generally in the form of a lever with each arm including a handgrip at one end and a detachable connecting means at the other end for unique, detachable interconnection with various garden tools and a garden cart to enable a plurality of gardening or lawn care functions to be accomplished with a minimum number of tools.

Another object of the invention is to provide a weed puller and garden tool in accordance with the preceding object in which the elongated arms are provided with a pivotal connecting means to enable the arms to be pivotally interconnected but yet separable from each other so that the arms, when in crossed relation may serve in the form of a pair of tongs with gripping members thereon for pulling weeds or for various other purposes in which a gripping action or movement of two tools toward and away from each other is desired.

Still another object of the invention is to provide a weed puller and garden tool in accordance with the preceding objects in which the connecting means on the arms and the associated bracket structures on the tools or garden cart are rendered effective and ineffective without the use of any tools by merely manipulating a spring-loaded latch device, thereby facilitating the interchangeability of tools and detachable connection of the arms with a garden cart.

Yet another object of the present invention is to provide a weed puller and garden tool in which the arms are each provided with a twisted central portion defining a crossover portion with the pivotal interconnection including a spring-loaded latch member to facilitate selective pivotal connection and disconnection of the arms.

Still another important object of the present invention is to provide a weed puller and garden tool which is universal in use, dependable and long lasting, simple to manipulate, reduces the cost of garden and lawn tools by enabling a plurality of interchangeable tools to be connected to an elongated handle and facilitates various gardening and lawn care procedures.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the weed puller illustrating a pair of elongated arms or handles in crossed, pivotal relationship with gripping plates at one end thereof.

FIG. 2 is an edge view of the weed puller of FIG. 1 illustrating further structural details of the device.

FIG. 3 is a fragmental, enlarged elevational view, with portions broken away, illustrating the detachable, pivotal interconnection between the arms.

FIG. 4 is a detailed sectional view taken substantially upon the plane passing along section line 4—4 of FIG. 3 illustrating further structural details of the pivotal interconnection and spring-loaded latch member therefor.

FIG. 5 is a fragmental, perspective view of the connecting means at the end of one of the arms for engagement with selective tools or a garden cart.

FIG. 6 is a detailed, sectional view, on an enlarged scale, taken on section line 6—6 on FIG. 2, illustrating the specific structure of the detachable connection between the arms and tools.

FIG. 7 is a side elevational view of a garden cart with the arms attached thereto.

FIG. 8 is an end view of the cart.

FIG. 9 is a fragmental, perspective view illustrating the attaching bracket on the cart for engagement with the connecting means on the arms.

FIG. 10 is a fragmental view illustrating an adjustable length handle.

DESCRIPTION OF THE PREFERRED EMBODIMENTS

Referring now specifically to FIGS. 1-6, the weed puller of the present invention is generally designated by reference numeral 10 with portions of the weed puller being capable of other uses, such as, connection to various garden tools and for connection to a garden cart in a manner described hereinafter. The weed puller includes a pair of elongated arms generally designated by numerals 12 and 14 which are disposed in crossed relationship with a detachable pivotal connection designated by numeral 16. Each of the arms 12 and 14, which also may be considered an elongated handle or lever, includes a cylindrical member 18 which may be tubular metal, solid wood, or the like, having a U-shaped yoke 20 attached thereto with the two legs of the U-shaped yoke 20 being interconnected by a handgrip 22 somewhat similar to a conventional loop-type handle employed on short handle shovels. The cylindrical member 18 is flattened and offset at 24 with this portion of the arms defining the intersecting or crossover portion. The flattened portion 24 is provided with a twist 26 along the longitudinal axis to define flattened end portions 28 perpendicular to the flattened portion 24 with the flattened portion 28 remote from the handgrip 22 being offset laterally in relation thereto as illustrated in FIG. 1. Also, each of the flat end portions 28 is provided with a detachable connecting means 30 by which the arms 12 and 14 may be connected with various implements, accessories, tools, or the like.

The pivotal interconnecting means 16 between the arms 12 and 14 includes a substantially cylindrical stud or pin 32 rigidly secured to the flat portion 24 of arm 14 with the stud 32 including a circular base 34 welded or otherwise rigidly secured to the flattened portion 24 of the arm 14. Also, the stud 32 is provided with a peripheral groove 36 therein which is adjacent the outer end of the stud but spaced slightly inwardly therefrom as illustrated in FIG. 4. The flattened portion 24 of the arm 12 is provided with an aperture 38 which receives the stud 32 therethrough, thus defining a pivot axis of connection between the arms 12 and 14. Disposed slidably along the outer surface of the flattened portion 24 of the arm 12 is a locking plate 40 having a notch 42 in the free end thereof which forms a bifurcated end with the notch 42 having a transverse width substantially the same as the diameter formed by the bottom of the groove 36 so that the edges of the slot or notch 42 are received in the groove 36 and engage the side walls of the groove 36 thus locking the arms 12 and 14 together for relative pivotal movement when the locking plate 40 is in a position with the notch 42 received in the groove 36 as illustrated in FIGS. 3 and 4.

The locking plate 40 is elongated and provided with a laterally extending end 44 remote from the notch 42 as illustrated in FIG. 4. A retaining and guiding cap or bracket 46 in the form of a rectangular, cup-shaped member is fixedly secured to the flattened portion 24 of the arm 12 as by welding, or the like, with the offset end 44 of the plate 40 guidingly received in the bracket 46. A slot 48 at one end of the bracket 46 slidably receives the plate 40, thus providing a positive guide for longitudinal reciprocation of the locking plate 40. A compression coil spring 50 is disposed between the offset end 44 of the locking plate 40 and the opposing end wall of the cup-shaped bracket 46, thus spring biasing the locking plate 40 towards the stud 32, thus normally retaining the notch 42 in the groove 36 and pivotally connecting the arms 12 and 14. The locking plate 40 is provided with a laterally extending handle 52 fixedly secured thereto and disposed through a slot 54 in the outer wall of the cup-shaped bracket 46. Thus, by engaging the handle 52 with the finger or thumb and exerting pressure thereon away from the stud 32, the locking plate 40 may be moved to its unlocked position by compressing the spring 50. Thus, with the pivotal connecting means 16 as disclosed, the two arms or handles 12 and 14 may be pivotally interconnected in crossed relationship, as illustrated in FIGS. 1-6, or by pulling on the handle 52 away from the stud 32, the pivotal connection 16 may be disengaged, thus enabling the arms or handles 12 and 14 to be separated for independent use for various purposes.

As illustrated in FIGS. 1-6, each of the arms 12 and 14 is provided with a generally rectangular gripping plate 56 forming a tool supported by each arm. The end of the plate 56 adjacent the flattened end portion 28 of each arm is provided with a relatively narrow projecting tab 58 having a U-shaped bracket 60 attached thereto which includes a pair of parallel, spaced legs 62 with each of the legs 62 including a slot 64 extending transversely of the legs 62. The terminal end of each flattened portion 28 is transversely straight as indicated by numeral 66 and, in spaced relation to the edge 66, each flattened portion 28 is provided with a transversely extending slot 68 which is dimensioned to closely receive one of the legs 62. The distance between the slot 68 and the edge 66 is such that when one of the legs 62 is received in the slot 68, the end edge 66 of the flattened portion 28 is abutting against the inner surface of the opposite leg 62 with this relationship being clearly illustrated in FIG. 6.

The connecting means 30 for securing the U-shaped bracket 60 and thus the tool plate 56 to each arm 12 and 14 includes a longitudinally slidable lock plate 70 disposed against the outer surface and slidable along the outer surface of the flattened portion 28, as illustrated in FIG. 6, with the free end of the lock plate 70 extending through the slots 64 in the legs 62, thus providing a rigid but detachable connection, since the slots 64 are disposed in spaced relation to the web or bight portion of the bracket 60 a distance so that the flattened portion 28 will be rigidly connected to the bracket 60. The upper end of the lock plate 70 is provided with a laterally extending end portion 72 slidably received in a generally rectangular, cup-shaped guide bracket 74 with a coil compression spring 76 being disposed between the laterally extending end portion 72 of the lock plate 70 and an opposing end wall of the bracket 74. The bracket 74 is suitably secured rigidly to the outer surface of the flattened end portion 28 by welding, or the like, and the end wall thereof opposite to that engaged by the spring 76 is provided with a slot 78 slidably guiding the lock plate 70, thus maintaining the lock plate 70 against the outer surface of the flattened end portion 28 since the outer edge of the laterally extending portion 72 is disposed against the inner surface of the guide bracket 74. A handle 80 having a knurled, rounded thumb or finger engaging portion 82 is connected to the lock plate 70 and extends out through a slot 84 formed in the outer wall of bracket 74 to enable manual retraction of the lock plate 70 by engaging the member 82 with the finger or thumb and moving it upwardly, thus compressing the spring 76 and retracting the lock plate 70 out of the slots 64 so that the U-shaped bracket may be disengaged from the flattened end portion 28 of the arm, with it being noted that the plates 56 will be swung away from each other during the connection and disconnection procedure.

The plates 56 include triangular shaped transverse ribs 86 thereon with the major lateral dimension of the ribs 86 being disposed upwardly, thus forming a gripping surface to facilitate use of the device in pulling weeds, so that the gripping plates 56 may be positioned in a spaced apart relation on opposite sides of a weed after which the handgrips 22 may be moved together for effectively gripping the weed so that it can be pulled from the ground. The tong action obtained may be used for various other purposes, such as picking up objects from the ground, depositing flower bulbs into the soil and covering seeds, or the like, by moving soil by moving the plates 56 toward each other.

The shape of the tools attached to the arms 12 and 14 may vary. For example, the configuration of the tools may be in the form of shovel-like members so that the device may be used to form cavities in the ground surface for planting purposes or for digging a post hole, or the like. Also, the arms 12 and 14 may be separated for use thereof with individual tools, such as with a shovel, rake, hoe, or the like.

FIGS. 7-9 illustrate the arms 12 and 14 associated with a garden cart generally designated by numeral 90 and which includes a bottom wall 92 and an upstanding peripheral wall 94 which may be rectangular in configuration or any other desired shape. The cart is supported by a pair of wheels 96 adjacent the forward end thereof and a pair of generally V-shaped props or legs 98 adjacent the other end thereof. On each side wall of the cart, a U-shaped bracket 60 is provided with the bracket 60 including legs 62 with slots 64 therein which are identical to the bracket 60 illustrated in FIG. 6. This enables the arms 12 and 14 to be attached independently to the opposite end walls or side walls of the cart 90, as illustrated in FIG. 7, so that the arms or handles 12 and 14 may be utilized to move the garden cart from a position in a storage shed, garage, or the like, to the lawn or garden after which either or both of the arms 12 and 14 may be disconnected from the cart and connected to appropriate tools carried in the cart. In order to support a plurality of tools in readily accessible position, the cart is provided with an upstanding leg 100 at each end thereof interconnected by a transversely extending support member 102 having a plurality of supporting hooks 104 associated therewith which are of a configuration to receive the slots 64 in one or both of the legs 62 of the U-shaped brackets attached to the tools. For illustrative purposes, a gripping plate 56 is illustrated as well as a shovel designated by numeral 106 with it being pointed out that various other tools may be provided and supported on the hooks 104 in readily accessible position so that the tools may be selectively and independently connected to the arms 12 or 14 or utilized in pairs when appropriate when the arms 12 and 14 are pivotally interconnected in crossed relationship. Thus, by providing a pair of arms or handles which are either pivotally interconnected or separated from each other, a plurality of interchangeable tools may be provided along with the cart so that the tools, cart and arms or handles may be easily rolled to a desired site and the selected tools utilized for desired purposes, thereby reducing the number of independent tools which have to be purchased and maintained, thus reducing the over-all cost of gardening and lawn care and enabling the tools to be more readily retained in an assembled relationship for easy access when it is desired to use the tools.

FIG. 10 illustrates an embodiment of the device in which the member 18' is telescopically adjustable by using a manually manipulatable clamp assembly 19. This enables the length of each arm or handle to be adjusted depending upon the tool being used. For example, a longer handle is used with a rake tool as compared with the weed puller arrangement shown in FIGS. 1–6.

While the device has been disclosed specifically as a full size tool, it is within the scope of this invention to provide the assembly in a small or miniature size, preferably constructed of plastic, for use as a toy. This enables small children to "work" in the garden or lawn alongside of their parents or other older persons and to use similar tools.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A weed puller and garden tool comprising a pair of elongated handles oriented in intersecting relation, means pivotally and detachably interconnecting said elongated handles, handgrip means at one end of each of said handles and detachable connecting means at the other end of each of said handles for interchangeably mounting garden or lawn care tools or implements thereto to facilitate use of the handles when pivotally interconnected and when separated from each other, said means pivotally and detachably connecting the handles including a projecting stud rigid with one of the handles and received through an opening in the other of the handles, said stud including a peripheral groove adjacent the free end thereof, the other of the handles including a movable lock plate slidably mounted thereon with one end of the lock plate including a notch received in the peripheral groove in the stud for locking the handles together with the notch in the lock plate moving peripherally in the groove during pivotal movement of the handles, spring means biasing the lock plate to locking position, and handle means on the lock plate to retract the lock plate to a released position to enable the stud to be removed from the opening thereby detaching the handles.

2. The structure as defined in claim 1, wherein said detachable connecting means includes a transverse slot adjacent the end of each handle, a longitudinally sliding lock plate mounted on each handle for movement across the slot, spring means biasing the lock plate to a locked position, handle means on the lock plate for retracting the lock plate to a released position, said slot adapted to receive projecting bracket means on a tool with the bracket means including slot means receiving said lock plate when in locked position.

3. The structure as defined in claim 2, wherein said bracket means includes a U-shaped bracket having parallel legs, said slot means including a transversely extending slot in each leg, said slots in the legs being spaced from the bight portion of the U-shaped bracket a distance generally equal to the thickness of the portion of the handle having a transverse slot therein with one of the legs of the U-shaped bracket being inserted through the slot in the handle, the distance between the slot in the handle and the terminal end thereof being substantially equal to the distance between the legs of the bracket whereby the terminal end of the handle abuttingly engages the inner surface of the opposite leg of the bracket, said lock plate being received in the slots in the legs and retaining the terminal end portion of the handle in surface-to-surface engagement with the bight portion of the U-shaped bracket thereby rigidly securing the handle to the tool, implement, or the like.

4. The structure as defined in claim 3, wherein said tool is in the form of a plate having a gripping surface on one surface thereof whereby the handles, when pivotally interconnected, may be used as a weed puller with the handles in crossed relation to each other and forming a tong-like structure.

5. The structure as defined in claim 3, wherein said implement is in the form of a garden cart having opposite side walls with each of the opposite side walls including a U-shaped bracket thereon for receiving one of the handles when the handles are separated from each other, thereby enabling the cart to be moved from a storage area to a site of use.

6. The structure as defined in claim 5, wherein said cart includes a supporting member including a plurality of generally U-shaped hooks receiving the slots in the U-shaped brackets for mounting the tools thereon.

7. A connecting assembly for interchangeable handles and tools comprising a pair of members, one of said members including a slot spaced a predetermined distance from and parallel to its terminal end, the other of said members including a pair of spaced legs with one of the legs being inserted through said slot with the terminal end of said one member abutting the inner surface of the other leg, and slidable lock means mounted on said one member and engaged with at least one of said legs and in surface contact with said one member to lock the members rigidly together.

8. The structure as defined in claim 7 wherein said slidable lock means is in the form of a lock plate, each of said legs having a slot therein slidably receiving said lock plate, said legs being connected by a rigid member parallel to the lock plate with the space between the lock plate and rigid member being substantially the same as the width of the terminal end portion of the member outwardly of the slot for providing surface-to-surface engagement between the terminal end of said one member and the rigid member and lock plate.

9. The structure as defined in claim 8 together with spring means interconnecting the lock plate and said one member for biasing said lock plate to its locked position, and handle means on said lock plate for retracting the lock plate to its released position.

* * * * *